United States Patent
Stinson

(10) Patent No.: US 10,259,596 B2
(45) Date of Patent: *Apr. 16, 2019

(54) APPARATUS FOR MOUNTING A NUT PLATE ON AN AIRCRAFT PART AND THEN MASKING THE NUT PLATE DURING PAINTING OF THE AIRCRAFT PART CONTAINING THE NUT PLATE

(71) Applicant: Corsaire Components Ltd, Brooklyn, Threshfield (GB)

(72) Inventor: Dennis Dean Stinson, Threshfield (GB)

(73) Assignee: Corsaire Components Ltd, Thresfield (GB)

( * ) Notice: Subject to any disclaimer, the term of this patent is extended or adjusted under 35 U.S.C. 154(b) by 0 days.

This patent is subject to a terminal disclaimer.

(21) Appl. No.: 15/397,887

(22) Filed: Jan. 4, 2017

(65) Prior Publication Data
US 2017/0197733 A1 Jul. 13, 2017

(30) Foreign Application Priority Data
Jan. 13, 2016 (GB) .................................. 1600688.4

(51) Int. Cl.
*B64F 5/10* (2017.01)
(52) U.S. Cl.
CPC ..................... *B64F 5/10* (2017.01)
(58) Field of Classification Search
None
See application file for complete search history.

(56) References Cited

U.S. PATENT DOCUMENTS 3,718,068 A * 2/1973 Passer .................... F16B 15/02
411/38
4,762,451 A 8/1988 Collins
(Continued)

FOREIGN PATENT DOCUMENTS

GB 2532444 A 5/2016
JP 2001353457 A 12/2001
(Continued)

*Primary Examiner* — Charles Capozzi
(74) *Attorney, Agent, or Firm* — Iandiorio Teska & Coleman, LLP

(57) ABSTRACT

Apparatus (88) for mounting a nut plate (4) on an aircraft part and then masking the nut plate during painting of the aircraft part (6) containing the nut plate (4), which apparatus (88) comprises:
(i) the nut plate (4);
(ii) a first bore (10) which extends through the nut plate (4);
(iii) a masking formation (8) which is made of a rigid plastics material;
(iv) a second bore (52) which extends through the masking formation (8); and
(v) a mandrel (68) which is made of a flexible material and which extends through the first and second bores (10, 52),
and the apparatus (88) being such that:
(vi) the masking formation (8) comprises a body portion (14), a masking portion (16) which is positioned at one end of the body portion (14) and which extends radially outwardly beyond the body portion (14), and a skirt portion (20) which is positioned at a periphery (22) of the masking portion (16) and which extends from a first face (24) of the masking portion (16) and away from the body portion (14);
(vii) the body portion (14) extends from a second face (24) of the masking formation (8); and
(Continued)

(viii) the mandrel (68) has a first portion (70) of a first diameter which locates in the first and second bores (10, 52), and a second portion (72) which is of a second and smaller diameter and which is for locating the apparatus (88) during the mounting and then for being pulled to remove the mandrel (68) from the remainder of the apparatus (88) after the painting.

10 Claims, 14 Drawing Sheets

(56) References Cited

U.S. PATENT DOCUMENTS

| | | | | |
|---|---|---|---|---|
| 5,013,391 | A * | 5/1991 | Hutter, III | B05C 17/00503 |
| | | | | 156/578 |
| 2003/0118419 | A1* | 6/2003 | Easterbrook | B21J 15/02 |
| | | | | 411/1 |
| 2011/0150599 | A1* | 6/2011 | Bakken | F16B 17/006 |
| | | | | 411/183 |
| 2016/0136673 | A1 | 5/2016 | Stinson | |

FOREIGN PATENT DOCUMENTS

| | | |
|---|---|---|
| JP | 2009072869 A | 4/2009 |
| JP | 2009293053 A | 12/2009 |

* cited by examiner

APPARATUS FOR MOUNTING A NUT PLATE ON AN AIRCRAFT PART AND THEN MASKING THE NUT PLATE DURING PAINTING OF THE AIRCRAFT PART CONTAINING THE NUT PLATE

This invention relates to apparatus for masking a nut plate during painting of an aircraft part containing the nut plate.

Various parts of aircraft, for example parts of aircraft wings and bodies are secured together by devices known as nut plates. Usually the parts are secured together by a large number of the nut plates which are located around the periphery of parts to be secured together. Often there is a slight misalignment between a hole in a first part and a hole in a second part which is placed on top of the first part. To allow for this misalignment, the nut plates take the form of a T-nut having a part located in a channel. A clip which is like a circlip is located in a groove in the channel, and grips the part of the T-nut in the channel. The T-nut moves within the clip, and thus the T-nut is able to move back and forth in the channel as may be required to compensate for the misalignment. When the aircraft parts are painted, for example sprayed, paint tends to get on the nut plate and secure it in position. It is then necessary to break the nut plate free from the dried paint so that the nut plate can move as required for connection purposes.

The problem of paint drying on nut plates, and stopping them moving is substantial. An aircraft may have hundreds or thousands of the nut plates. The time taken to break the nut plates free from dried paint so that they can move as required is very substantial.

In order to meet the above mentioned problem, it is known to use masking apparatus comprising a masking formation which is made of a rigid plastics material, a bore which extends axially through the masking formation, and a mandrel which is made of a flexible material and which extends through the bore in the masking formation such as to project beyond the masking formation. The flexible material is a soft rubber material. The masking formation comprises a body portion, a masking portion which is positioned at one end of the body portion and which extends radially outwardly beyond the body portion, and a skirt portion which is formed at a periphery of the masking portion and which extends from a first face of the masking portion and away from the body. The body portion extends from a second face of the masking portion. The mandrel comprises a first portion of a first diameter which locates in the bore, and a second portion which is of a second and smaller diameter and which is for locating the apparatus during the painting.

In use of the above mentioned known apparatus, the soft rubber mandrel is inserted through a hole in a part of the aircraft. An operator then pulls on the mandrel to seat the masking portion over the hole. The mandrel stops paint getting in the hole. The masking formation covers the T-nut. After painting, the mandrel is pulled out of the hole and disposed of. It is easy to pull the mandrel out of the hole because the mandrel comprises the flexible material. Prior to the use of the known masking apparatus, the nut plate first has to be secured in position on the aircraft part. This is done by sticking the nut plate in position on the aircraft part using an adhesive. In order to locate the nut plate in the required position on the aircraft part around the hole in the aircraft part, and also to maintain the nut plate in position whilst the adhesive sets, another mandrel is used. This mandrel is also made of a flexible material, and it is also disposed of after use.

The use of one mandrel to secure the nut plate in position and another mandrel to secure the masking formation in position during painting is disadvantageous for several reasons. First, the use of two mandrels involves two separate operations, which is significant in terms of operator time for effecting the installation of the mandrels. Second, the disposal of the two mandrels after use is not good for the environment, especially since the mandrels are typically made of a flexible synthetic plastics material. Third, the material cost and manufacturing cost of the two mandrels are significant cost considerations in the installation of the nut plates and the subsequent painting of the aircraft parts containing the nut plates.

It is an aim of the present invention to reduce the above mentioned problems.

Accordingly, in one non-limiting embodiment of present invention there is provided apparatus for mounting a nut plate on an aircraft part and then masking the nut plate during painting of the aircraft part containing the nut plate, which apparatus comprises:

(i) the nut plate;
(ii) a first bore which extends through the nut plate;
(iii) a masking formation which is made of a rigid plastics material;
(iv) a second bore which extends through the masking formation; and
(v) a mandrel which is made of a flexible material and which extends through the first and second bores, and the apparatus being such that:

(vi) the masking formation comprises a body portion, a masking portion which is positioned at one end of the body portion and which extends radially outwardly beyond the body portion, and a skirt portion which is positioned at a periphery of the masking portion and which extends from a first face of the masking portion and away from the body portion;
(vii) the body portion extends from a second face of the masking formation; and
(viii) the mandrel has a first portion of a first diameter which locates in the first and second bores, and a second portion which is of a second and smaller diameter and which is for locating the apparatus during the mounting and then for being pulled to remove the mandrel from the remainder of the apparatus after the painting.

The apparatus of the present invention is advantageous in that it uses only one mandrel instead of two mandrels. This thus halves the above mentioned problems.

Preferably, the masking formation is such that:

(i) there are no supporting formations extending between the body portion and the second face of the masking portion, whereby the second face of the masking portion is free from supporting formations which would act to provide unwanted masking of areas of parts of the aircraft being painted; and
(ii) the body portion and/or the masking portion are such that they are provided with internal integral reinforcing that causes the body portion and/or the masking portion to be sufficiently thick that breaking of the masking portion will not occur during use of the apparatus, even although there are no supporting formations extending between the body portion and the masking portion.

If desired, the masking formation may be provided with the supporting formations. The avoidance of the supporting formations is preferred because the apparatus of the present invention is then able to avoid the masking of areas on the aircraft part that should be painted. The integral reinforcing avoids the need to have external supporting formations such as for example as buttresses, and which would cause unwanted the masking during painting. Thus the parts are able to painted without the unwanted masking. Also, the internal reinforcing enables the apparatus to be used without unwanted breaking of the masking portion, for example during the pushing and pulling of the apparatus that is required to break the apparatus free from the dried paint.

Preferably, the apparatus is one in which the internal integral reinforcing is an extra wall thickness.

The body portion may be in the form of a cylinder. Other shapes of the body portion may be employed. Where the body portion is a cylinder, then the cylinder will usually be circular in cross section. Other cross sectional shapes may however be employed so that, for example, the body portion may be hexagonal or octagonal in cross section.

The masking portion may be a plate. Other shapes for the masking portion may be employed so that, for example, the masking portion may be a disc.

The bore will usually be circular in cross section. Bores having other cross sectional shapes may however be employed.

The first and second portions of the mandrel may be of circular cross section. The first and second portions of the mandrel may be of other cross sectional shapes if desired.

The rigid plastics material may be, for example, a thermoplastics material. The rigid plastics material may be acrylonitrile butadiene styrene (ABS), nylon or ethylene. Other types of rigid plastics materials may be employed.

The flexible material is preferably rubber. The flexible material may alternatively be a flexible plastics material. When the flexible material is rubber, then the rubber is preferably a soft rubber.

The nut plate may be a known type of nut plate.

An embodiment of the invention will now be described solely by way of example and with reference to the accompanying drawings in which.

Figure 1:
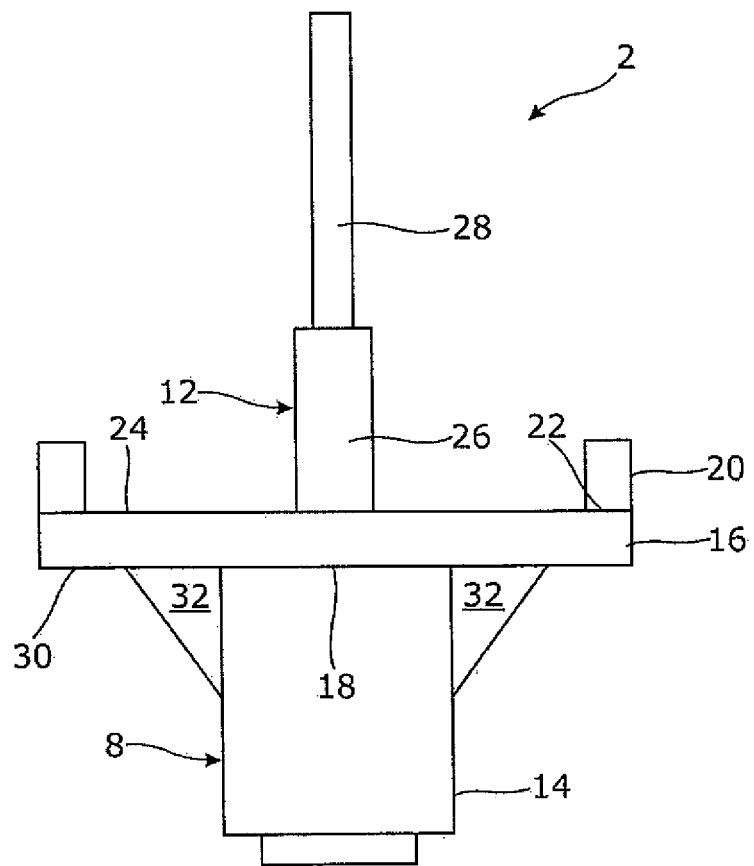
FIG. 1 shows known apparatus for masking a nut plate during painting of an aircraft part containing the nut plate.
Figure 2:
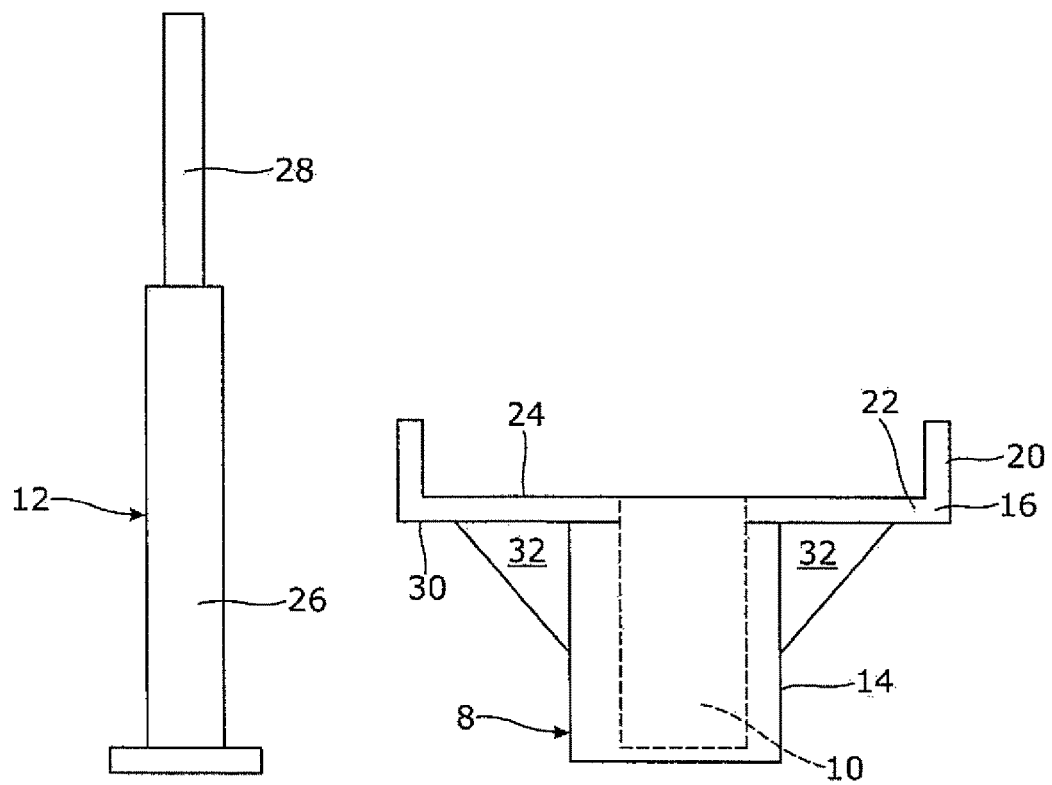
FIG. 2 is an exploded view of the known apparatus shown in FIG. 1.
Figure 3:
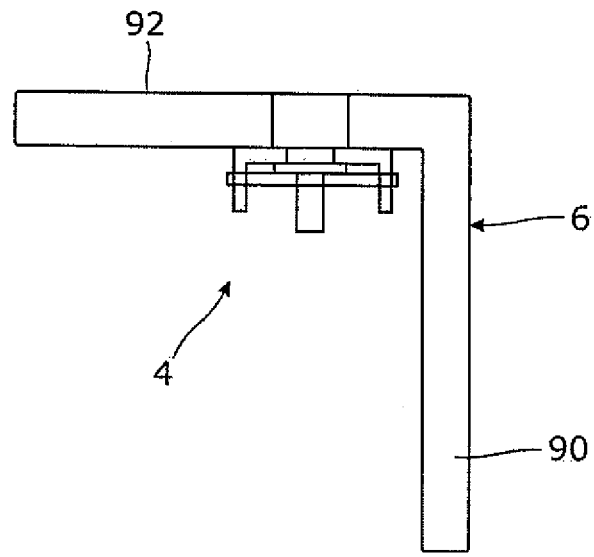
FIG. 3 is an end view of a right angled aircraft part containing a nut plate.

Referring to FIGS. 1-6, there is shown known apparatus 2 for masking a nut plate 4 during painting of an aircraft part 6 containing the nut plate 4. The apparatus 2 comprises a masking formation 8 which is made of a rigid plastics material. A bore 10 extends axially through the masking formation 8.

The apparatus 2 also comprises a mandrel 12 which is made of a flexible material and which extends through the bore 10 in the masking formation 8 such as to project beyond the masking formation 8 as shown.

The apparatus 2 is such that the masking formation 8 comprises a body portion 14, a masking portion 16 which is positioned at one end 18 of the body portion 14 and which extends radially outwardly as shown beyond the body portion 14. The masking formation 8 further comprises a skirt portion 20 which is positioned at a periphery 22 of the masking portion 16 and which extends from a first face 24 of the masking portion 16 and parallel to the bore 10 and away from the body portion 14.

The mandrel 12 has a first portion 26 of a first diameter which locates in the bore 10, and a second portion 28 which is of a second and smaller diameter and which is for locating the apparatus 2 during the painting.

The body portion 14 extends from a second face 30 of the masking portion 16.

In order to support the masking portion 16 on the body portion 14, buttresses 32 are employed. There may be four of the buttresses 32 radially disposed around the body portion 14.

Figure 4:
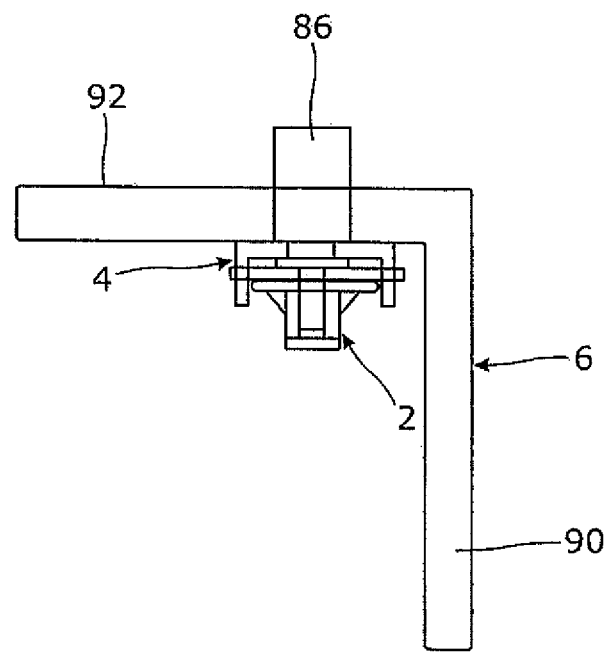
FIG. 4 is an end view like FIG. 3 and shows the apparatus of FIG. 1 in position.
Figure 5:
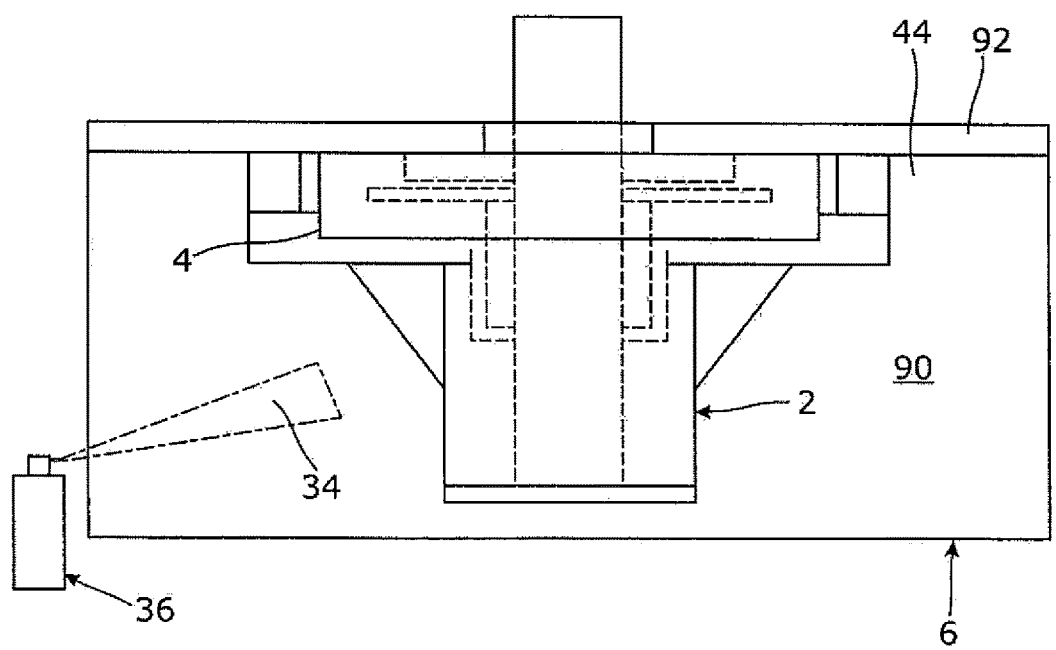
FIG. 5 is an enlarged front view of what is shown in FIG. 4 and illustrates painting of the aircraft part by spraying.
Figure 6:
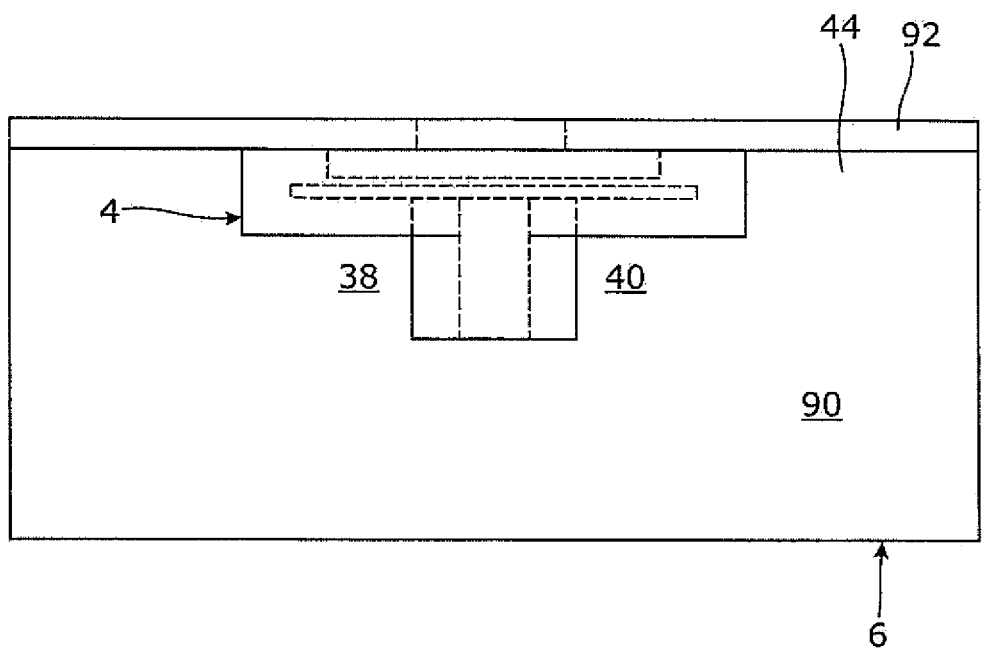
FIG. 6 is a view like FIG. 5, with the known apparatus removed, and showing non-painted areas caused by the known apparatus causing unwanted masking.
Figure 7:
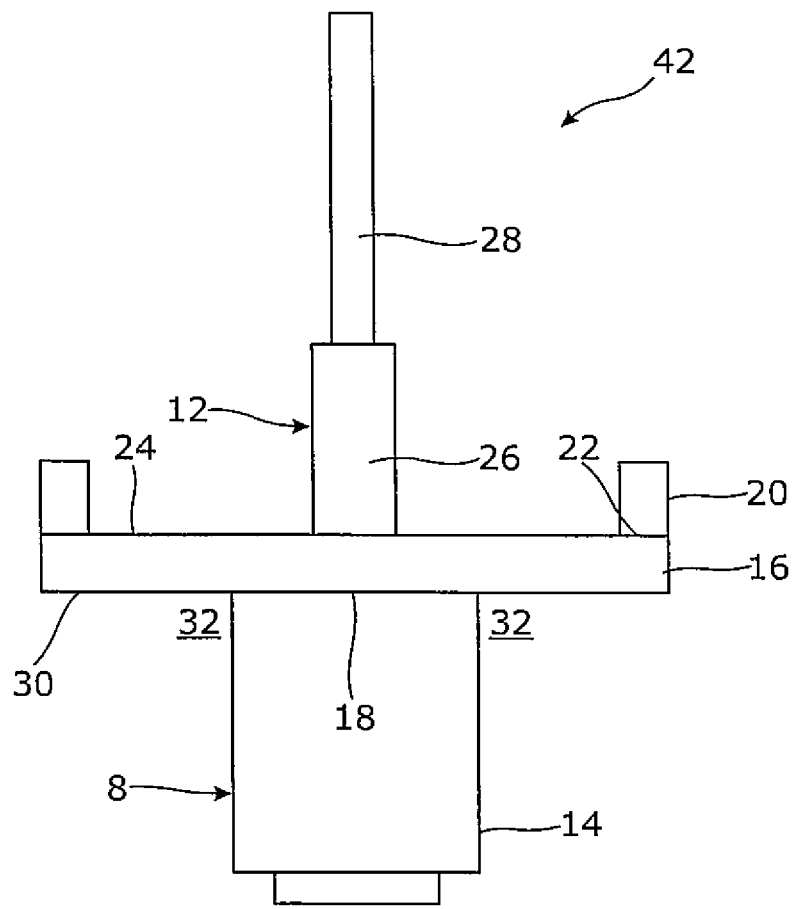
FIG. 7 is like FIG. 1 but shows alternative apparatus for masking a nut plate during painting of an aircraft part containing the nut plate.
Figure 8:
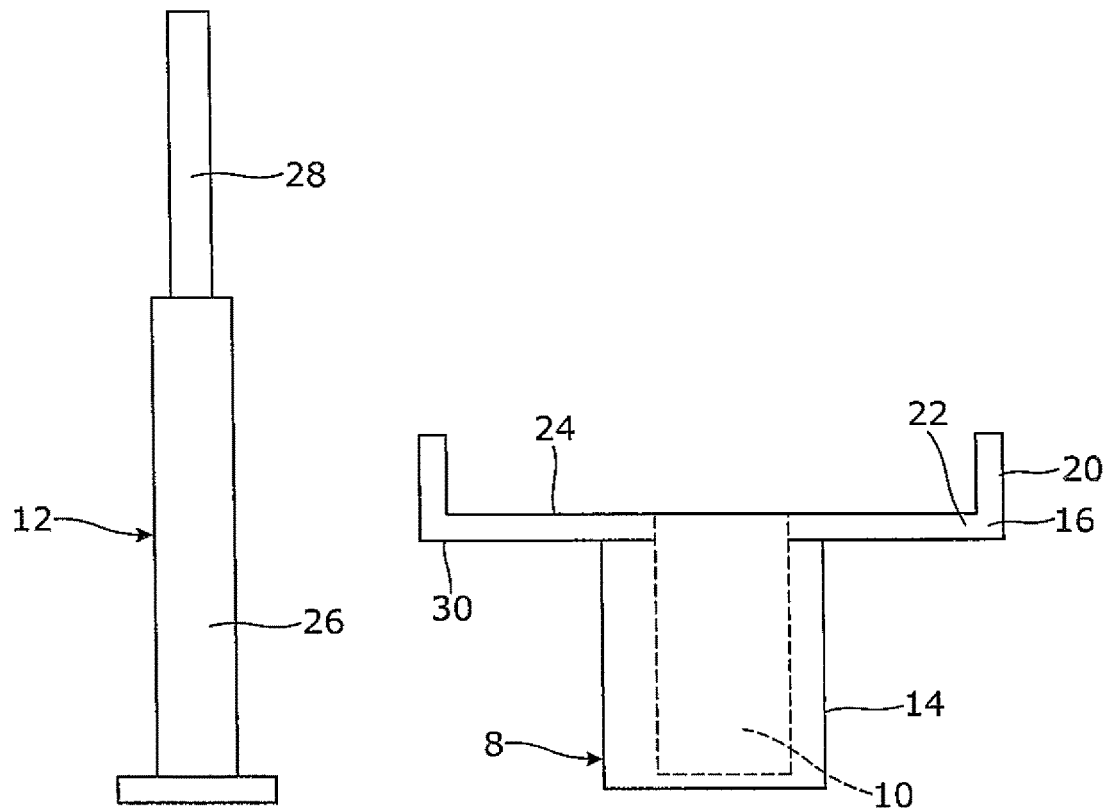
FIG. 8 is an exploded view like FIG. 2 but is of the apparatus shown in FIG. 7.
Figure 9:
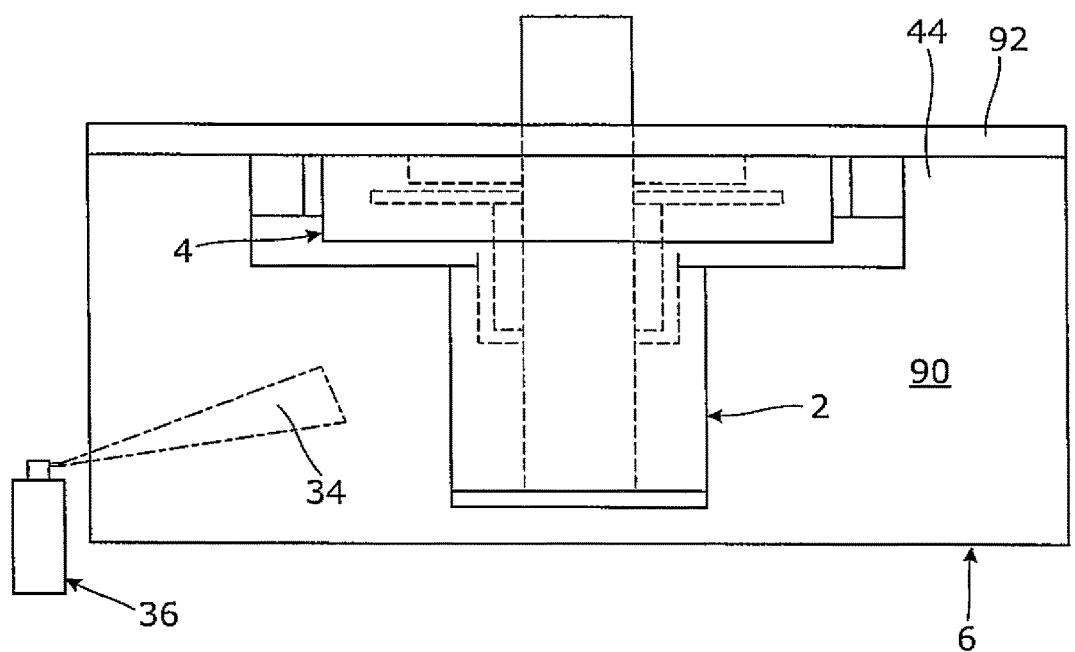
FIG. 9 is a view like FIG. 5 but is of the apparatus shown in FIG. 7 in use during spraying.
Figure 10:
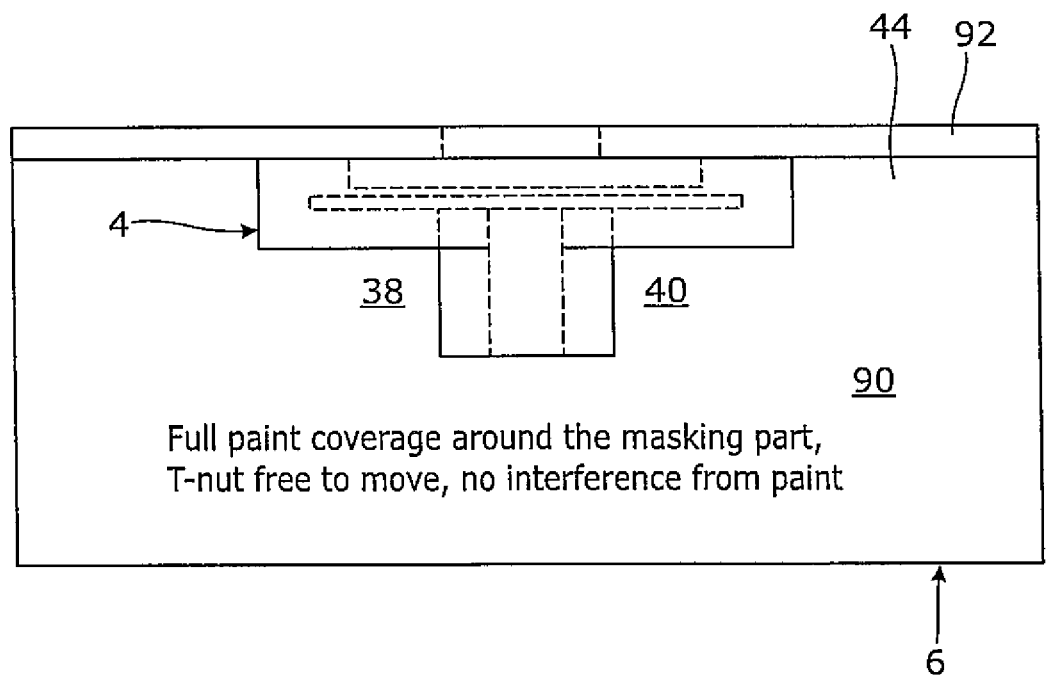
FIG. 10 is a view like FIG. 6 and shows how there has been no unwanted masking with the apparatus as shown in FIG. 7 and used during spray painting as shown in FIG. 9.

As shown in FIGS. 4, 5 and 6, when the apparatus 2 is in use and the aircraft part 6 is being sprayed by a spray 34 from a container 36, the buttresses 32 cause unwanted masking of areas of the aircraft part 6 being sprayed. These masked areas are shown as non-painted areas 38, 40 in FIG. 6.

After use and when the paint has dried, the mandrel 12 is able to be pulled out of the bore 10. This is easily accomplished because the mandrel 12 is made of the flexible material so that it easily breaks away from any dried paint. The skirt portion 20 ensures that a good clean painted line is achieved around the part 6 requiring to be painted. The mandrel 12 ensures that the bore 10 does not have any paint in it. However, when the apparatus 2 is removed, there will be the areas 38, 40 of the aircraft part 6 that have not been painted. Painting these areas 38, 40 causes substantial work in view of the large number of aircraft parts having the nut plates 4. Leaving the areas 38, 40 unpainted may lead to premature degradation of these areas and/or may not be aesthetically pleasing.

Referring now to FIGS. 7-10, there is shown apparatus 42. Similar parts as in the apparatus 2 have been given the same reference numerals for ease of comparison and understanding.

In the apparatus 42, it will be seen that there are no supporting formations in the form of the buttresses 32 extending between the body portion 14 and the second face 30 of the masking portion 16. Thus the second face 30 of the masking portion 16 is free from the buttresses 32. This means that the apparatus 42 is free from the buttresses 32 which would otherwise mask areas of the aircraft part 6 requiring to be painted.

Hitherto, the unwanted masking problem caused by the buttresses 32 has not been realised, nor has it been realised how to overcome the problem. If the buttresses 32 were simply removed from the known apparatus 2, then the masking portion 16 would have a tendency to break during the pushing and pulling of the apparatus 2 that is required to pull the apparatus 2 away from the painted aircraft part 6 after the aircraft part 6 has been painted and the paint has dried. As will be appreciated, there may be various pushing and pulling forces, and even twisting forces. The simple removal of the buttresses 32 would thus generate another problem, i.e. that of the breaking of the masking portion 16. Changing the rigid plastics material used for the masking formation 8 to a metal would lead to manufacturing and cost problems.

The solution employed in the apparatus 42 is firstly to ensure that there are no buttresses 32 or similar supporting formations, and secondly to provide the body portion 14 and/or the masking portion 16 with the internal integral reinforcing material. The internal integral reinforcing material causes the body portion 14 and/or the masking portion 16 to be sufficiently thick that breaking of the masking portion 16 will not occur.

The use of the internal integral reinforcing material does not easily present itself as a solution to the problem of removing the buttresses 32. More specifically, the buttresses 32 are external and this is where reinforcing would normally be employed. It would not be thought possible to employ buttresses internally because such internal buttresses would engage the nut plate 4. Internal buttresses would thus stop operation of the location of the nut plate 4 and/or the clip in the groove.

The configuration shown in FIGS. 7-10 is based on the realisation that there is sufficient internal space between the nut plate 4, the clip and the groove to enable an increase in the internal thickness of the body portion 14 and/or the masking portion 16. This increase in the internal thickness of the body portion 14 and/or the masking portion 16 is sufficient to provide the required strength to enable removal of the masking apparatus after the painting and without breaking of the masking portion 16. It is also at a position where it does not cause the unwanted masking.

As can be seen from FIGS. 7-10, the internal integral reinforcement is an extra wall thickness. The body portion 14 is a cylinder. The cylinder is of circular cross section. The masking portion 16 is a disc. The bore 10 is of circular cross section. The first and second portions 24, 26 of the mandrel 12 are of circular cross section.

The masking formation 8 is made of a rigid plastics material. More specifically, the rigid plastics material is a thermoplastics material such for example as ABS, nylon or ethylene. The mandrel 12 is made of a flexible material in the form of rubber. The rubber is a soft rubber.

Referring to FIGS. 11-16, there is shown known apparatus 44 for mounting a nut plate 46 on the aircraft part 6. The apparatus 44 is used in the initial installation of the nut plate 46 on the aircraft part 6, and it is thus used before the known apparatus 2 which is able to be used for masking the nut plate 46 during painting of the aircraft part 6 containing the nut plate 46.

The apparatus 44 is well known and is produced by Click Bond of Carson City, Nev., USA. The apparatus 44 comprises a plate 48 which has a threaded formation 50. The threaded formation 50 has a bore 52 provided with internal threads 54. The threaded formation 50 forms a T-nut as can be appreciated from FIG. 14. The plate 48 is a loose fit in a housing 56. The housing 56 comprises a central receiving portion 58 for receiving the plate 48, and two side flanges 60, 62. The plate 48 is held in position in the housing 56 by a clip 64 which is like a circlip and which locates in slots 66 in the side flanges 60, 62. The central receiving portion 58 and the side flanges 60, 62 effectively define a channel in which the plate 48 is located.

Figure 11:
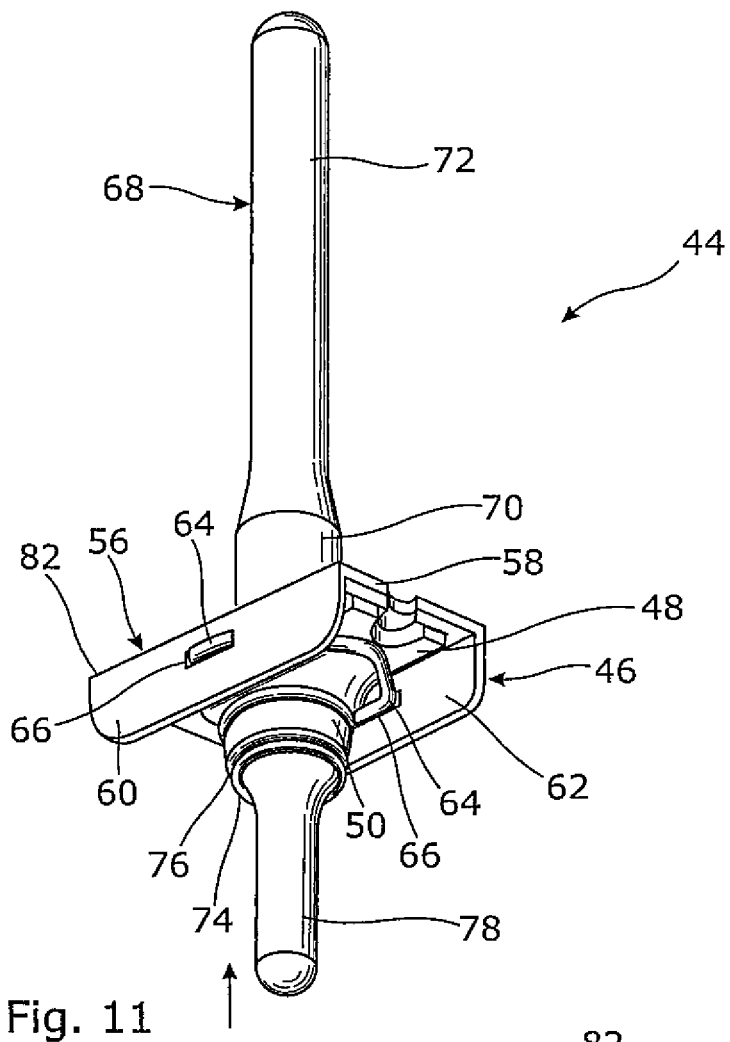
FIG. 11 is a perspective view from one side and underneath of apparatus for installing a nut plate on an aircraft part.
Figure 12:
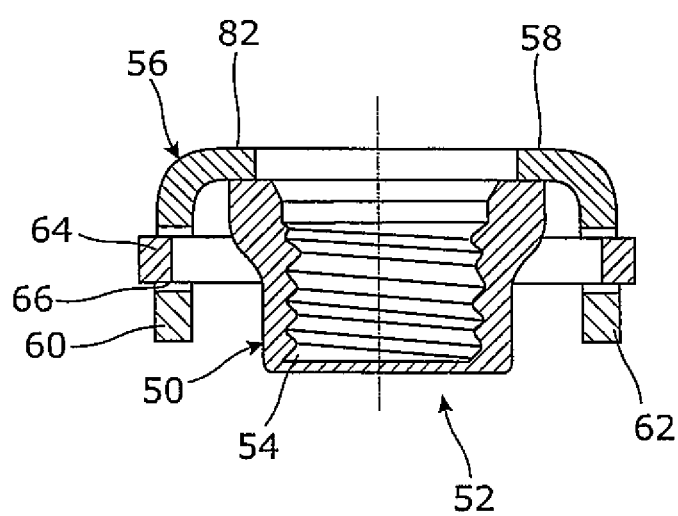
FIG. 12 is a cross section through the shortest dimension of the nut plate shown in FIG. 11.
Figure 13:
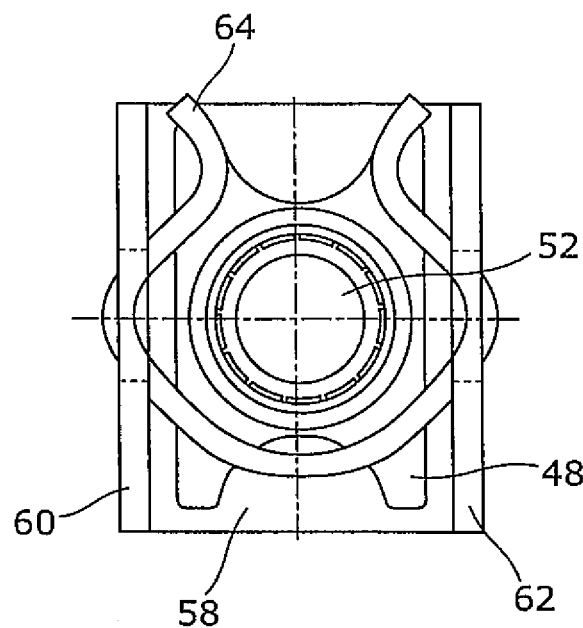
FIG. 13 is an underneath plan view of the nut plate shown in FIG. 11.
Figure 14:
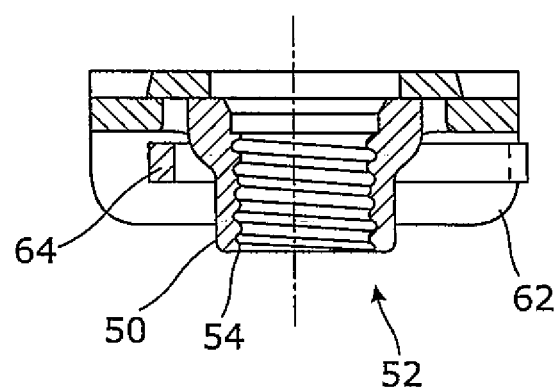
FIG. 14 is a cross section through the longest dimension of the nut plate as shown in FIG. 11.

The apparatus 44 comprises a mandrel 68 which is made of a flexible material. The mandrel 68 has a first portion 70 of a first diameter, and a second portion 72 of a second and smaller diameter. The first portion 70 locates in the bore 52 in the nut plate 46. A flange 74 on the first portion 70 abuts against an end 76 of the threaded formation 50 of the nut plate 46. A portion 78 of the mandrel 68 is for use in pushing the mandrel 68 upwardly as shown in FIG. 11 and through the bore 52.

Figure 15:
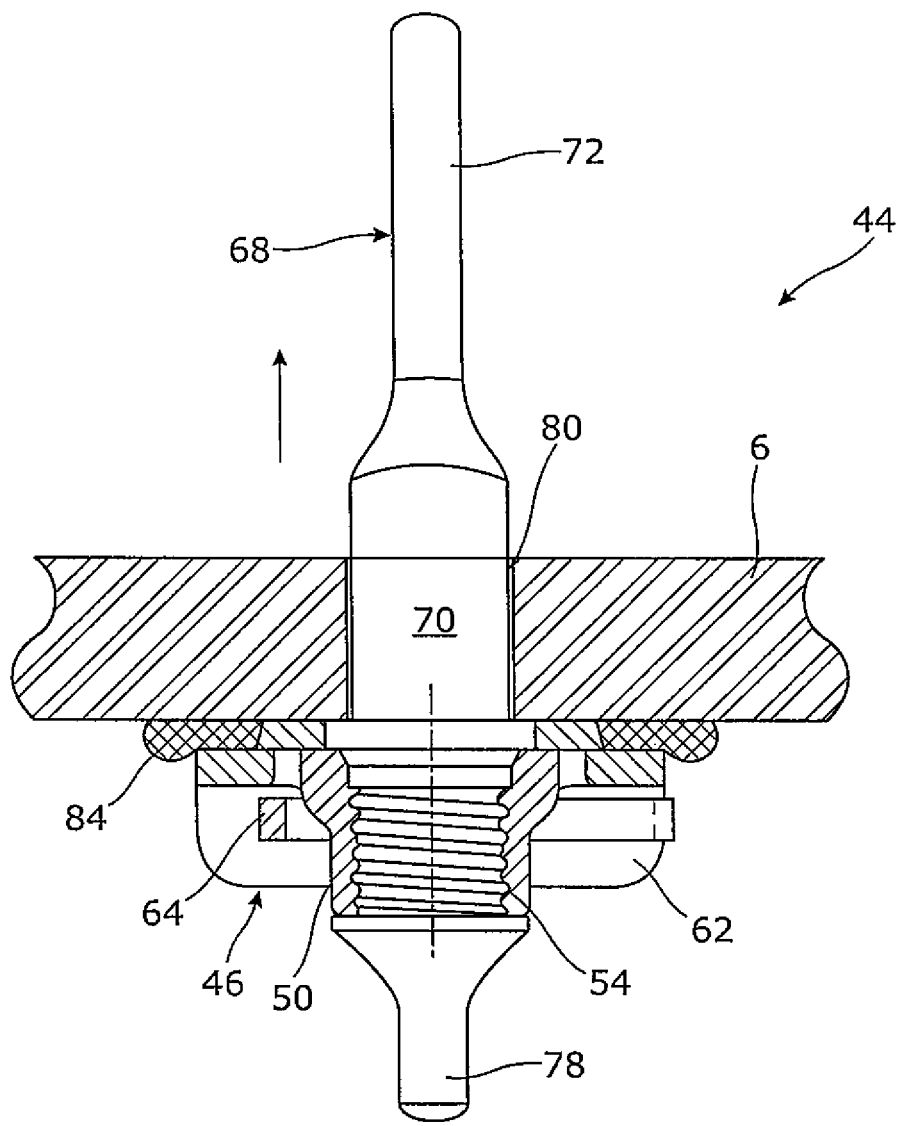
FIG. 15 is a cross section like that shown in FIG. 14 and additionally shows the nut plate secured by an adhesive an aircraft part, and also shows the mandrel used for locating the nut plate and holding the nut plate in position during setting of the adhesive.
Figure 16:
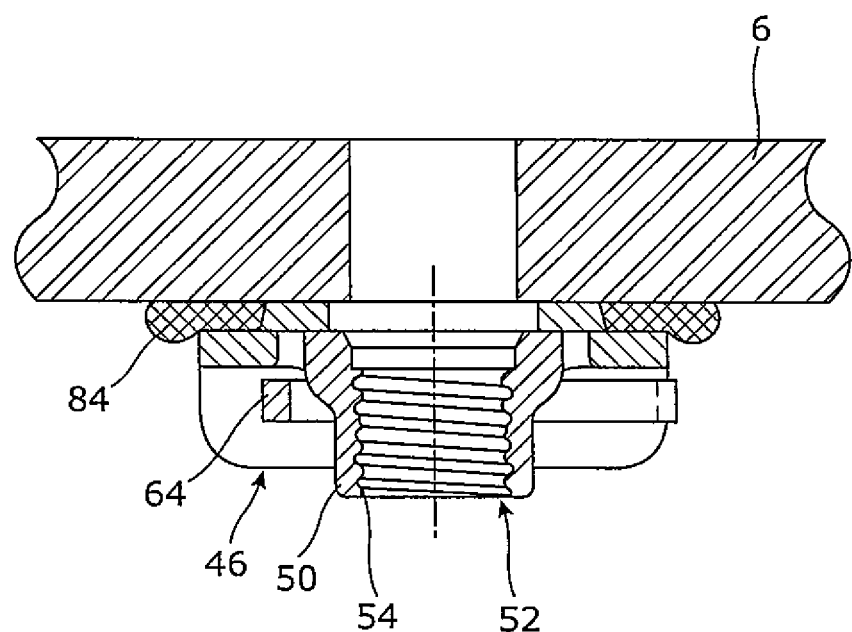
FIG. 16 is a view like FIG. 15 but shows the mandrel having been removed after the adhesive has set.

FIG. 15 shows how the apparatus 44 is used. More specifically, the second portion 72 of the apparatus 44 is pushed through a hole 80 in the aircraft part 6. The first portion 70 locates in the hole 80.

The central receiving portion 58 has a surface 82 which is provided with a peel off protective film (not shown). This protective film is removed at the time of use of the apparatus 44. An adhesive 84 is provided as shown in FIG. 15. The adhesive 84 sticks the nut plate 46 to the aircraft part 6. The mandrel 68 holds the nut plate 46 in position whilst the adhesive 84 sets, for example cures. When the adhesive 84 has set and the nut plate 46 is securely stuck to the aircraft part 6, then the mandrel 68 is removed as can be appreciated from a comparison of FIGS. 15 and 16. The mandrel 68 is removable simply by being pulled upwardly as shown in FIG. 15. The upward pulling is facilitated by the second portion 72 of the mandrel 68. Thus the second portion 72 of the mandrel 68 acts firstly to locate the mandrel in the hole 80, and secondly to be available for being pulled upon to pull the mandrel 68 though the nut plate 46 and through the aircraft part 6. In the position shown in FIG. 16, the bore 52 is then available for receiving a nut bolt which is able to be threaded into the bore 52 via the internal threads 54. A typical nut bolt 86 is shown in FIG. 4.

Figure 17:
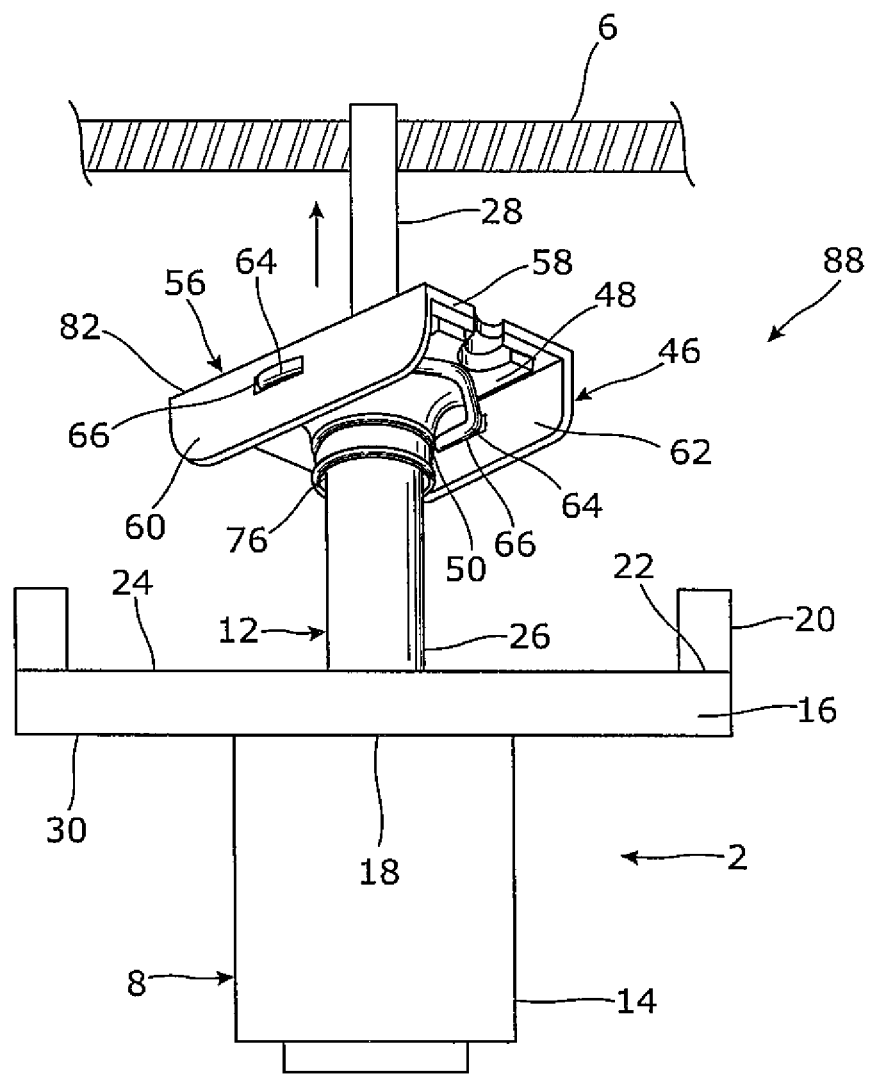
FIG. 17 shows apparatus of the present invention, with a nut plate part being shown in perspective, and a masking part being shown in side view.

FIG. 17 shows apparatus 88 of the present invention. Parts of apparatus 88 shown in previous Figures have been given the same reference numerals for ease of comparison and understanding. The apparatus 88 is advantageous in that it uses a single mandrel 12 both to fix the nut plate 46 and also the masking apparatus 2. The use of the single mandrel 12 avoids two separate installation operations as would be the case with two separate mandrels. The single mandrel 12 also avoids the disposal of two separate mandrels. Further, the use of the single mandrel 12 avoids the material cost and manufacturing cost of making two separate mandrels.

It is to be appreciated that the embodiment of the invention described above with reference to the accompanying drawings has been given by way of example only and that modifications may be effected. Thus, for example, the aircraft part 6 has been shown as a right angled part having a first side 90 and a second side 92. Other types of aircraft parts that are secured together by nut plates may be used. Also, nut plates 4 of various designs may be used. Further, other types of masking formations and other type of mandrels to those shown in the drawings may be used. Individual components shown in the drawings are not limited to use in their drawings and they may be used in other drawings and in all aspects of the invention.

The invention claimed is:

1. Apparatus for mounting a nut plate on an aircraft part and then masking the nut plate during painting of the aircraft part containing the nut plate, which apparatus comprises:
   (i) the nut plate;
   (ii) a first bore which extends through the nut plate;
   (iii) a masking formation which is made of a rigid plastics material;
   (iv) a second bore which extends through the masking formation; and
   (v) a mandrel which is made of a flexible material and which extends through the first and second bores, and the apparatus being such that:
   (vi) the masking formation comprises a body portion, a masking portion which is positioned at one end of the body portion and which extends radially outwardly beyond the body portion, and a skirt portion which is positioned at a periphery of the masking portion and which extends from a first face of the masking portion and away from the body portion;
   (vii) the body portion extends from a second face of the masking formation;
   (viii) the mandrel has a first portion of a first diameter which locates in the first and second bores, and a second portion which is of a second and smaller diameter than the first diameter and which is for locating the apparatus during the mounting and then for being pulled to remove the mandrel from the remainder of the apparatus after the painting; and
   (ix) at least a portion of the masking formation is configured to fit inside a channel part of the nut plate and thereby to effect masking in the inside of the channel part of the nut plate.

2. Apparatus according to claim 1 in which the masking formation is such that:
   (i) there are no supporting buttresses extending between the body portion and the second face of the masking portion, whereby the second face of the masking portion is free from supporting buttresses which would act to provide unwanted masking of areas of parts of the aircraft being painted; and
   (ii) the body portion and/or the masking portion are such that they are provided with internal integral reinforcement that prevents the breaking of the masking portion during use of the apparatus, even although there are no supporting buttresses extending between the body portion and the masking portion.

3. Apparatus according to claim 2 in which the internal integral reinforcement is an integral part of a wall of the body portion and/or an integral part of a wall of the masking portion.

4. Apparatus according to claim 1 in which the body portion is a cylinder.

5. Apparatus according to claim 4 in which the cylinder is circular in cross section.

6. Apparatus according to claim 1 in which the masking portion is a plate.

7. Apparatus according to claim 1 in which the second bore is circular in cross section.

8. Apparatus according to claim 1 in which the first and second portions of the mandrel are of circular cross section.

9. Apparatus according to claim 1 in which the rigid plastics material is a thermoplastics material.

10. Apparatus according to claim 1 in which the flexible material is rubber.

* * * * *